Oct. 17, 1967  B. C. CRANAGE  3,347,270
PRESSURE EQUALIZING FLOW CONTROL VALVE
Filed March 11, 1965  2 Sheets-Sheet 1
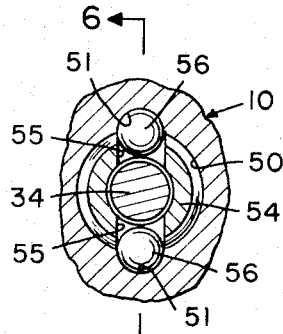
FIG. 5
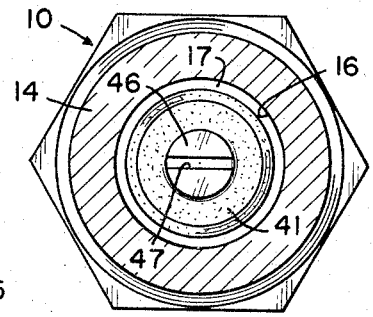
FIG. 4
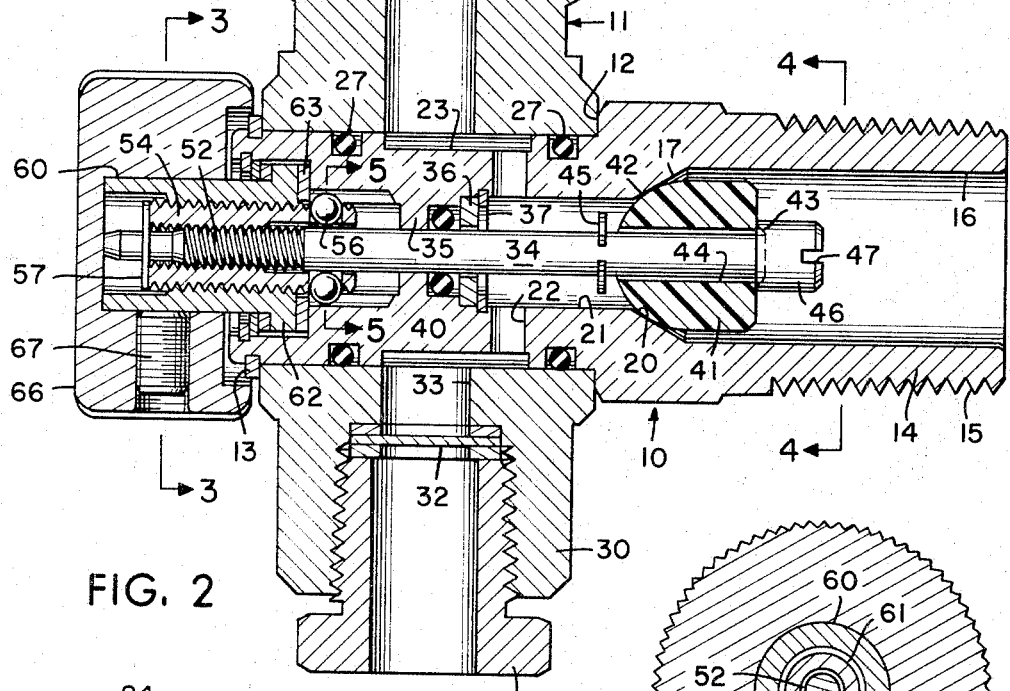
FIG. 2
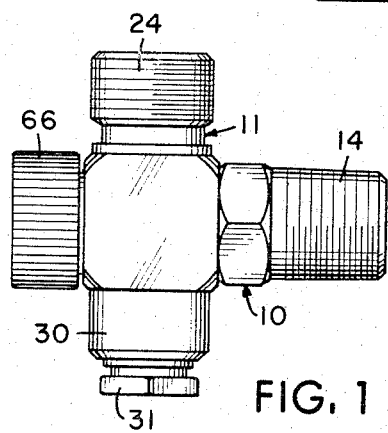
FIG. 1
FIG. 3
INVENTOR
BIDWELL C. CRANAGE
BY
Cohn and Powell
ATTORNEYS

United States Patent Office 3,347,270
Patented Oct. 17, 1967

3,347,270
PRESSURE EQUALIZING FLOW
CONTROL VALVE
Bidwell C. Cranage, Ferguson, Mo., assignor to Stile-Craft Manufacturers, Inc., St. Louis, Mo., a corporation of Missouri
Filed Mar. 11, 1965, Ser. No. 438,849
11 Claims. (Cl. 137—630.15)

ABSTRACT OF THE DISCLOSURE

A flow control valve including an actuating means operatively connected to a stem for moving the stem in a direction to close a pilot valve means and a main valve means under tension of the stem. A key is carried by and movable with the stem to prevent stem rotation, and is engageable with a stop shoulder to limit the stem stroke in the valve-closing direction so that the only tension applied to the stem is that required to provide effective closure.

---

This invention relates generally to a flow control valve, and more particularly to an improved mechanism for actuating a high pressure valve.

The present improvements provide a flow control valve that is especially adapted for advantageous use in dispensing fluid, either gas or liquid, under high pressure, and which has a variety of uses in the industrial, hospital or laboratory fields. For example, and without limitation, the valve can be connected to an oxygen tank in a welding assembly for industrial use or in a resuscitation system for hospital use.

A important objective is achieved, in a valve having a main valve means between inlet and outlet openings and having a pilot valve means operatively connected to the main valve means, and by the provision of actuating means that requires very little manual effort to crack the pilot valve means and open the main valve means against high flow pressure, and which operates to close both valve means effectively and easily.

Another important objective is realized in that the pilot valve means includes a stem operatively connected to the actuating means for axial movement in a longitudinal direction to cause closure of both the main and pilot valve means under a tensional force applied to the stem, and by the provision of abutment means limiting the stem stroke so that the only tension applied to the stem is that necessary to provide effective closure, thereby enabling the use of a stem of small cross section, which in turn minimizes the over-all size of the valve and its component parts.

Yet another important object is attained by the provision of a key assembly including an element carried by and movable with the stem which precludes rotation, yet permits longitudinal reciprocative movement of the stem, the key element engaging a coacting shoulder in its path upon longitudinal movement of the stem in the valve-closing direction, whereby to limit the stem stroke and hence limit the tensional force applied to the stem to effect valve closure.

An important object is provided by a limiting means having a first stop shoulder carried by and movable with the stem, and a second stop shoulder within the valve body and retained in the path of the movable stop shoulder, the stop shoulders interengaging to limit the stem stroke.

Another advantage is achieved by making at least one of the stop shoulders adjustable relative to the other along the longitudinal axis of the stem so that the extent of the stem stroke in the valve-closing direction can be precisely determined in order to control the tension applied to the stem and to control the effective sealing pressure on both the main and pilot valve means.

Still another important objective is realized by the provision of a sleeve mounted on the stem for adjustment along the longitudinal stem axis, the sleeve being operatively connected to actuating means for selectively moving the sleeve and stem in the valve-closing direction so that a first stop shoulder on and movable with the sleeve engages a second stop shoulder retained in the path of the first stop shoulder whereby to attain the functional advantages and results discussed previously. The sleeve is adjustable to regulate the stem stroke in the valve-closing direction and thereby exactly determines the tension on the stem and the sealing pressure exerted by the main and pilot valve means.

An important object is afforded by the structural arrangement in which a key element is carried by and movable with the sleeve, the key element being received in a fixed key slot to constrain the sleeve and stem to longitudinal reciprocative movement without rotation, the key element constituting a stop shoulder that abuts another stop shoulder to limit the stem stroke in the valve-closing direction.

Another important objective is attained by the provision of means rotatively mounted on the body and threadedly connected to the sleeve, the means axially moving the sleeve and stem longitudinally and selectively in either direction upon threaded rotation on the sleeve depending on the direction of turning.

It is advantageous for the sleeve to be threadedly connected to the stem for adjustment along the lingitudinal stem axis in order to adjust the effective relative position of the key element and its cooperating stop shoulder, and thereby accurately determine the extent of stem stroke.

An important object is to provide a high pressure, flow control valve that is simple and durable in construction, economical to manufacture and assemble, highly efficient in operation, and which can be utilized and adjusted by anyone with little or no instruction.

The foregoing and numerous other objects and advantages of the invention will more clearly appear from the following detailed description of a preferred embodiment, particularly when considered in connection with the accompanying drawings, in which:

FIG. 1 is a side elevational view of the flow control valve;

FIG. 2 is an enlarged cross-sectional view of the valve as seen in a vertical plane passed through the longitudinal axis;

FIG. 3 is a cross sectional view as seen along line 3—3 of FIG. 2;

FIG. 4 is a cross-sectional view as seen along line 4—4 of FIG. 2;

FIG. 5 is an enlarged, fragmentary cross-sectional view as seen along line 5—5 of FIG. 2.

Figure 6:
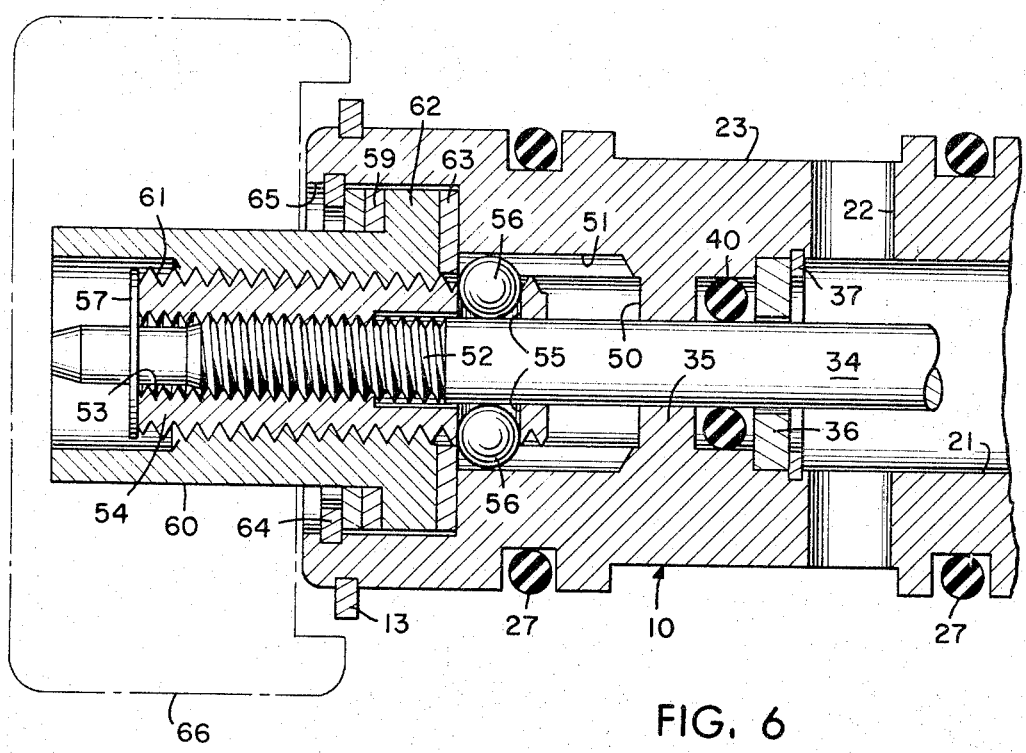
FIG. 6 is an enlarged cross-sectional view of a portion of the mechanism shown in FIG. 2, for the purpose of clarity.

Referring now by characters of reference to the drawings, and first to FIG. 2, it is seen that the valve body, in the preferred embodiment, consists of a pair of body portions 10 and 11 interconnected so that the body portion 11 swivels about and on the body portion 10. Specifically, the body portion 11 is provided with a central bore that receives a cylindrical part of body portion 10, the swiveled body portion 11 being retained between shoulder 12 formed integrally on the body portion 10 and a lock ring 13.

The elongated tubular body portion 10 includes an inlet fitting 14 provided with external threads 15 adapted for attachment to a source of fluid under high pressure, the fitting 14 defining an inlet opening 16 through which fluid is introduced under such high pressure. Formed in the body portion 10 is a main valve seat 17 converging inwardly in the direction of fluid flow and defining a main valve port 20. On the outlet side of the main valve port 20, the body portion 10 is provided with an internal chamber 21 that communicates through a plurality of radially extending lateral ports 22 with an external annular recess 23 formed on the center body portion on which the body portion 11 is swively mounted. The swiveled member 11 includes an outlet fitting 24 having external threads 25 adapted for attachment to some means (not shown) to which fluid under high pressure is to be introduced. The outlet fitting 24 defines an outlet opening 26 communicating with the annular recess 23 in any adjusted angular position of the swiveled body portion 11.

To provide an effective seal at the swivel connection of the body portions 10 and 11, a pair of O-rings 27 are carried by the cyclindrical bearing part of the body portion 10 and engage the associated contiguous bearing surface on the cooperating body portion 11 to provide an effective seal therebetween. One of the O-rings 27 is disposed at each side of the annular recess 23.

Of course, it will be understood that the body portions 10 and 11 could be cast in one piece, if desired. In this event, there would be no swivel action between body portions.

The swiveled body portion 11 includes another fitting 30 at the side opposite to the outlet fitting 24. This body fitting 30 is adapted to engage threadedly and receive a tubular plug 31 that clamps a rupture disc 32 across a passage 33 communicating with the annular recess 23 and thence through radial ports 22, chamber 21 and main valve port 20. When the valve mechanism is subjected to an excessively high pressure that might cause damage to the component parts of the valve or create a hazardous condition, such excessively high pressure will cause a rupture of the disc 32 so that the pressure will be immediately relieved. It is seen that the disc 32 acts as a safety element.

The valve mechanism includes an elongate stem 34 reciprocatively mounted within the body portion 10. More particularly, the center portion of stem 34 is journaled in internal bearing 35 formed integrally with the body portion 10 and is journaled in the insert bearing 36. The insert bearing 36 is retained in place by the lock ring 37. An O-ring 40 held between the bearing 35 and 36 sealingly engages the stem 34, and thereby provides an effective seal between the stem 34 and the body portion 10.

The elongate stem 34 extends longitudinally through the flow chamber 21, through the main valve port 20 and into the inlet opening 16 on the inlet side of the main valve port 20. Slidably mounted on the end of the stem 34 is a main valve element 41 having a rounded surface 42 at one end adapted to engage the main valve seat 17 to close the main valve port 20, and having a flat surface constituting a pilot valve seat 43 at the opposite end. The main valve element 41 has a substantial clearance with its associated stem 34 to provide a pilot valve passage 44 therebetween which is adapted to operatively interconnect the inlet opening 16 with the outlet opening 26, when open. A small retaining ring 45 is fixed to the stem 34, the ring 45 engaging the main valve element 41 when the stem is moved in the valve-opening direction, so as to urge the main valve element 41 away from its main valve seat 17, and thereby open the main valve port 20 and operatively interconnect the inlet and outlet openings 16 and 26.

Formed integrally on the end of the stem 34 is a pilot valve element 46 adapted to engage the pilot valve seat 43 and close the pilot valve passage 44 when the stem 34 is moved in the valve-closing direction. In addition to closing the pilot valve passage 44, the pilot valve element 46 urges the main valve element 41 tightly into sealing relation with its main valve seat 17 under tension applied to stem 34.

For reasons which will later appear, the pilot valve element 46 is provided with an end slot 47 adapted to receive and interconnect with a suitable tool, such as a screw driver, inserted through the inlet opening 16 for appropriate rotative adjustment of stem 34 whereby to determine the extent of the stem stroke in the valve-closing direction.

From FIG. 6, it will be understood that the opposite end of the stem 34 extends through an internal chamber 50 formed at the opposite side of the body bearing 35, and extends out the opposite end of the body portion 10. The body chamber 50 is substantially cylindrical in shape and is provided with a pair of elongate key slots 51 extending in the same direction as the longitudinal axis of stem 34. The end portion of stem 34 is provided with threads 52 that engage compatible internal threads 53 formed in a sleeve 54 mounted on and carried by the stem 34. The sleeve 54 slidably interfits the body chamber 50. The position of the sleeve 54 can be adjusted longitudinally along the stem 34 by threaded adjustment.

The inner end of sleeve 54 is provided with a pair of side openings 55 adapted to receive and hold a pair of balls 56 constituting key elements that ride on the unthreaded portion of stem 34 and which project outwardly of the sleeve 54 to ride in the corresponding key slots 51. This key assembly afforded by the operative interconnection of the balls 56 in the key slots 51 constrains the sleeve 54 to reciprocative movement without rotation, and thereby constrains the stem 34 to the same type of reciprocative movement, as the stem is actuated in the valve-opening and valve-closing directions. As will later appear, the balls 56 constitute shoulders that cooperate to determine the extent of stem stroke in the valve-closing direction. A lock element 57 is detachably connected to the end of stem 34 and engages the end of sleeve 54, when the sleeve 54 has been adjusted to the desired longitudinal position along the longitudinal axis of sleeve 54, in order to hold the sleeve 54 and stem 34 in the adjusted relative position.

An actuating means is operatively connected to sleeve 54 for reciprocatively moving stem 34. This actuating means includes a hub 60 threadedly connected to external threads 61 formed on sleeve 54, the hub 60 having an annular flange 62 rotatively mounted in the body portion 10 between washers 63. A retaining ring 64 is fixed to the body portion 10 and extends within the end recess 65 to engage the outermost washer 63, thereby holding the hub 60 and body portion 10 in assembly and holding the hub flange 62 and its associated bearing washers 63 in rotative assembly. A knob 66 is fixed to the hub 60 by lock pin 67. The periphery of knob 66 is knurled to provide an effective gripping surface that facilitates manual turning.

The innermost washer 63 constitutes a stop shoulder that is retained in the path of the key balls 56 constituting cooperating stop shoulders, when the stem 34 and sleeve 54 are moved in the valve-closing direction, so that the key balls 56 will engage this innermost washer 63 to limit the extent of stem stroke. As the stem 34 is moved in the valve-closing position, tension is applied to the stem 34 to cause effective sealing of both the pilot valve element 46 and the main valve element 41. It is most desirable to apply only sufficient tension to the stem 34 to provide this effective valve closure. This result is attained by the abutment of the key balls 56 with the innermost washer 63.

The relative position of the key balls 56 along the longitudinal axis of stem 34 can be accurately determined in order to afford this advantageous result by turning the stem 34, by application of a screw driver to the slot 47, so that the threaded connection of the stem 34 with the sleeve 54 will move the sleeve 54, and hence the key balls 56 carried by the sleeve 54, to an adjusted position in which the key balls 56 and the innermost washer 63 engage to limit the stem stroke so that the only tension applied to the stem 34 is that required to provide effective closure. It will be understood that with this structural arrangement, the key balls 56 are adjustable relative to the innermost washer 63 along the longitudinal axis of stem 34 to cause engagement of the key balls 56 and washer 63 when the stem 34 is moved a sufficient longitudinal distance to close both the pilot and main valve means effectively without causing unnecessary tension on stem 34.

It is thought that the usage and functional advantages of this high pressure flow control valve have become fully apparent from the foregoing detailed description of parts, but for completeness of disclosure, the operation will be briefly described. It will be assumed that the inlet fitting 14 is operatively connected to a source of fluid under high pressure and that the outlet fitting 24 is operatively connected to some means for utilizing this fluid under high pressure. Moreover, it will be assumed that the valve mechanism is conditioned so that the valve means, both main and pilot, are effectively closed.

Before attachment of the inlet fitting 14 to the high pressure source, the valve mechanism is adjusted as previously described to assure that the minimum tension is applied to stem 34 when the valve means are closed. Briefly, to make this adjustment, the knob 66 is turned until the key balls 56 engage the innermost washer 63. Then, the stem 34 is turned within its associated sleeve 54 so as to adjust the relative position of stem 34 in sleeve 54 until the pilot valve element 46 engages the pilot valve seat 43 to close the pilot valve passage 44 and urges the main valve element 41 against its associated main valve seat 17 to close the main valve port 20, all without excessive strain on stem 34. Then, the lock element 57 is applied to the end of stem 34 to engage the sleeve 54, thereby maintaining the adjusted relative position of stem 34 and sleeve 54. Thereafter, upon movement of the stem 34 in the valve-closing direction, the key balls 56 will engage the innermost washer 63 to limit the stem stroke. When the key balls 56 engage the washer 63, as described, the main valve port is closed and the pilot valve passage 44 is closed. The only strain applied to stem 34 is that required to cause effective closure. Any undue strain is transmitted to and absorbed by the abutment of the key balls 56 and washer 63.

It will be understood that because the main valve element 41 and the pilot valve element 46 are located on the inlet side of the main valve port 20, that the high pressure existing in the inlet opening 16 tends to move these valve elements 41 and 46 to their closed positions. Under these circumstances, these valve elements 41 and 46 must be moved against this high pressure in order to open the main valve port 20. The presently improved valve actuating mechanism requires very little manual effort to crack the pilot valve means and open the main valve means against this high flow pressure, and operates easily to close both valve means effectively.

If it is desired to open the flow control valve, the knob 66 is easily turned, such rotative action turning the hub 60. As a result of the threaded connection of the hub 60 with the sleeve 54, and because the sleeve 54 is constrained against rotative movement by the key assembly, the rotative action of hub 60 moves the sleeve 54 and hence the stem 34 longitudinally in a valve-opening direction. Because the pilot valve element 46 has only a minor surface area subjected to the high pressure at the inlet opening 16, the pilot valve element 46 can be easily moved against such pressure. However, the high pressure exerted on the main valve element 41 continues to hold the element 41 sealingly against the main valve seat 17. When the pilot valve element 46 is moved away from its pilot valve seat 43, and the pilot valve passage 44 is opened to place the inlet opening 16 in direct communication with the body chamber 21, the pressures at the opposite sides of the main valve element 41 are quickly equalized. Then, upon continued longitudinal axial movement of the stem 34 in the valve-opening direction, the ring 45 engages the main valve element 41 and will move such element 41 away from its main valve seat 17, and thereby open the main valve port 20. The flow of fluid will then pass from the inlet opening 16 through the main valve port 20 and into the body chamber 21, and thence through the side ports 22 into the annular recess 23 for discharge through the outlet opening 26.

To close the valve, the knob 66 is turned in the opposite direction so that the rotation of hub 60 through its threaded connection with sleeve 54 causes the sleeve 54 and the stem 34 to move longitudinally in the opposite, valve-closing direction. Upon such longitudinal movement of stem 34, the pilot valve element 46 will engage the pilot valve seat 43 and close the pilot valve passage 44, and will urge the main valve element 41 against its main valve seat 17 to close the main valve port 20. The interconnection of the hub 60 with the sleeve 54, and the threaded connection of sleeve 54 with stem 34, creates a strain or tension in the stem 34 to hold both the main valve element 41 and the pilot valve element 46 effectively closed. Upon effective valve closure, the key balls 56 engage the innermost washer 63 to limit the stem stroke in this valve-closing direction so that the tension applied to the stem 34 is limited to only that required to provide and maintain effective valve closure. Any further effort exerted in turning the knob 66 is transmitted directly to and absorbed by the abutment of key balls 56 with the innermost washer 63, and does not result in any additional tension being applied to the stem 34.

Although the invention has been described by making detailed reference to a single preferred embodiment, such detail is to be understood in an instructive, rather than in any restrictive sense, many variants being possible within the scope of the claims hereunto appended.

I claim as my invention:

1. A flow control valve comprising:
   (a) a body having an inlet opening and an outlet opening,
   (b) a main valve means between the openings,
   (c) a pilot valve means operatively connected to the main valve means and including a stem movable in one direction to close the pilot valve means and the main valve means under tension of the stem,
   (d) actuating means operatively connected to the stem for moving the stem in the valve-closing direction,
   (e) a key connection including an element carried by and movable with the stem to prevent rotation of the stem, and
   (f) a stop shoulder in the path of the key element engaging the key element to limit the stem stroke in the valve-closing direction so that the only tension applied to the stem is that required to provide effective closure.

2. A flow control valve as defined in claim 1, in which:
   (g) the key element is adjustable relative to the stop shoulder along the longitudinal axis of the stem to cause engagement of the key element with the stop shoulder when the stem is moved a sufficient longitudinal distance to close both the pilot and main valve means effectively without causing unnecessary tension on the stem.

3. A flow control valve comprising:
   (a) a body having an inlet opening and an outlet opening,
   (b) a main valve means between the openings,
   (c) a pilot valve means operatively connected to the main valve means and including a stem movable in one direction to close the pilot valve means and the main valve means under tension of the stem,
   (d) a sleeve mounted on the stem for adjustment along the longitudinal stem axis,
   (e) a key element carried by and movable with the sleeve,
   (f) a fixed key slot receiving the key element and constraining the sleeve and stem to longitudinal movement without rotation, (g) actuating means operatively connected to the sleeve for selectively moving the sleeve and stem in the valve-closing direction, and (h) a stop shoulder retained in the path of the key element, (i) the key element engaging the stop shoulder to limit the stem stroke in the valve-closing direction, (j) the sleeve being adjustable along the longitudinal axis of the stem to cause engagement of the key element with the stop shoulder when the stem is moved a sufficient longitudinal distance to close both the pilot and main valve means effectively without causing unnecessary tension on the stem.

4. A flow control valve comprising:
(a) a body having an inlet opening and an outlet opening,
(b) a main valve means between the openings,
(c) a pilot valve means operatively connected to the main valve means and including a stem movable in one direction to close the pilot valve means and the main valve means under tension of the stem,
(d) a sleeve mounted on the stem for adjustment along the longitudinal stem axis,
(e) a key element carried by and movable with the sleeve,
(f) a fixed key slot receiving the key element and constraining the sleeve and stem to longitudinal movement without rotation,
(g) means rotatively mounted on the body and threadedly connected to the sleeve, the means upon rotation moving the sleeve and stem longitudinally in either direction selectively to open or close the main and pilot valve means,
(h) a stop shoulder retained in the path of the movable key element,
(i) the key element engaging the stop shoulder to limit the stem stroke in the valve-closing direction,
(j) the sleeve being adjustable along the longitudinal stem axis to cause engagement of the key element with the stop shoulder when the stem is moved a sufficient longitudinal distance to close both the pilot and main valve means effectively without causing unnecessary tension on the stem.

5. A flow control valve as defined in claim 4, in which:
(k) the sleeve is threadedly connected to the stem for adjustment along the longitudinal stem axis to determine the length of the stem stroke in the valve-closing direction by varying the distance of relative movement of the key element and stop shoulder.

6. A flow control valve comprising:
(a) a body having an inlet opening and an outlet opening,
(b) a main valve means between the openings,
(c) a pilot valve means operatively connected to the main valve means and including a stem movable in one direction to close the pilot valve means and the main valve means under tension of the stem,
(d) a sleeve threadedly connected to the stem for adjustment along the longitudinal stem axis,
(e) a key element carried by and movable with the sleeve,
(f) a fixed key slot receiving the key element and constraining the sleeve and the stem to longitudinal movement without rotation,
(g) a knob rotatively mounted on the body and threadedly connected to the sleeve, the knob, upon rotation, moving the sleeve and stem longitudinally in either a valve-opening direction or a valve-closing direction,
(h) a stop shoulder retained in the path of the key element as the key element moves with the sleeve and stem in the valve-closing direction,
(i) the key element engaging the stop shoulder to limit the stem stroke in the valve-closing direction, and (j) means on the stem for rotating the stem relative to the sleeve and thereby adjust the longitudinal position of the sleeve, and hence the key element, along the stem to cause engagement of the key element and stop shoulder when the stem is moved a sufficient longitudinal distance to close both the pilot and main valve means effectively without causing unnecessary tension on the stem.

7. A flow control valve comprising:
(a) a body having an inlet opening and an outlet opening,
(b) a main valve seat between the openings defining a main valve port,
(c) a valve stem mounted in the body for reciprocative movement and extending through the main valve port,
(d) a main valve element mounted on the stem for relative axial movement and engaging the main valve seat on the inlet side of the main valve port,
(e) the main valve element having a pilot valve passage,
(f) a pilot valve element on and movable with the stem, the pilot valve element selectively engaging the main valve element on the inlet side of the main valve port to close the main valve passage upon axial movement of the stem in one direction and selectively disengaging from the main valve element to open the pilot valve passage upon axial movement of the stem in the other direction,
(g) means on the stem engaging the main valve element to disengage the main valve element from the main valve seat and open the main valve port after the pilot valve passage is opened upon axial movement of the stem in the valve-opening direction.
(h) actuating means operatively connected to the stem for axially moving the stem in either of said directions,
(i) means including abutting shoulders limiting the stem stroke in the valve-closing direction so that the only tension applied to the stem is that required to provide effective closure,
(j) the abutting shoulders include a first stop shoulder carried by and movable with the stem,
(k) a second stop shoulder retained in the path of the movable first stop shoulder, and
(l) the first stop shoulder carried by and movable with the stem consists of a key element that prevents rotation of the stem, yet permits the longiudinal axial movement of the stem in either the valve-opening or valve-closing directions.

8. A flow control valve as defined in claim 7, in which:
(m) the key element is adjustable relative to the second stop shoulder retained in its path upon axial movement of the stem and associated key element in the valve-closing direction to cause engagement of the key element and second stop shoulder when the stem is moved a sufficient longitudinal distance to close both the pilot and main valve means effectively without causing unnecessary tension on the stem.

9. A flow control valve comprising:
(a) a body having an inlet opening and an outlet opening,
(b) a main valve seat between the openings defining a main valve port,
(c) a valve stem mounted in the body for reciprocative movement and extending through the main valve port,
(d) a main valve element mounted on the stem for relative axial movement and engaging the main valve seat on the inlet side of the main valve port,
(e) the main valve element having a pilot valve passage,
(f) a pilot valve element on and movable with the stem, the pilot valve element selectively engaging the main valve element on the inlet side of the main valve port to close the pilot valve passage upon axial movement of the stem in a valve-closing direction and selectively disengaging from the main valve element to open the pilot valve passage upon axial movement of the stem in a valve-opening direction, (g) means on the stem engaging the main valve element to disengage the main valve element from the main valve seat and open the main valve port after the pilot valve passage is opened upon axial movement of the stem in the valve-opening direction, (h) a sleeve mounted on the stem for adjustment along the longitudinal stem axis, (i) a first stop shoulder on and movable with the sleeve, (j) actuating means operatively connected to the sleeve for selectively moving the sleeve and stem in either direction, (k) a second stop shoulder retained in the path of the movable first stop shoulder as the sleeve and stem are moved in the valve-closing direction, (l) the first and second stop shoulders engaging to limit the stem stroke in the valve-closing direction, (m) the sleeve being adjustable along the longitudinal axis of the stem to cause engagement of the stop shoulders when the stem is moved a sufficient longitudinal distance in the valve-closing direction to close both the pilot and main valve means effectively without causing unnecessary tension on the stem, (n) the first stop shoulder carried by and movable with the sleeve consists of a key element, (o) a fixed key slot receives the key element and constrains the sleeve and stem to longitudinal movement without rotation, (p) the key element engages the second stop shoulder retained in its path to limit the stem stroke, and (q) the sleeve is adjustable axially on the stem to change the longitudinal position of the key element to determine the length of the stem stroke and the sealing pressure of the pilot and main valve means.

10. A flow control valve as defined in claim 9, in which:

(r) the actuating means is rotatively mounted on the body and threadedly connected to the sleeve, the actuating means, upon rotation, moving the sleeve and stem longitudinally in either the valve-opening position or valve-closing position.

11. A flow control valve as defined in claim 10, in which:

(s) the sleeve is threadedly connected to the stem for adjustment axially along the longitudinal stem axis to position the key element carried by the sleeve relative to the second stop shoulder retained in the path of the key element in order to determine the length of the stem stroke in the valve-closing direction.

References Cited

UNITED STATES PATENTS

| | | | |
|---|---|---|---|
| 2,254,308 | 9/1941 | Nicholas | 137—630.14 |
| 2,899,935 | 8/1959 | Dalton | 91—6 |
| 2,905,198 | 9/1959 | Peeps | 251—285 X |
| 2,977,087 | 3/1961 | Lindgren | 251—285 X |
| 2,977,981 | 4/1961 | Jarrett | 251—285 X |
| 3,129,788 | 4/1964 | Heckt | 137—630.15 X |
| 3,253,612 | 5/1966 | Curatola | 137—630.15 X |

CLARENCE R. GORDON, *Primary Examiner.*